United States Patent [19]

Tuma

[11] 4,139,863

[45] Feb. 13, 1979

[54] CHROMA GENERATION SYSTEM

[75] Inventor: Wade B. Tuma, Campbell, Calif.

[73] Assignee: Atari, Inc., Sunnyvale, Calif.

[21] Appl. No.: 802,579

[22] Filed: Jun. 1, 1977

[51] Int. Cl.² .............................................. H04N 9/02
[52] U.S. Cl. .................................................. 358/82
[58] Field of Search ..................... 273/856, DIG. 28; 358/1, 22, 81, 82, 28, 16

[56] References Cited

U.S. PATENT DOCUMENTS

| | | | |
|---|---|---|---|
| 2,943,142 | 6/1960 | Loughlin | 358/16 |
| 3,146,302 | 8/1964 | Moore | 358/16 |
| 3,485,943 | 12/1969 | Gold | 358/28 X |
| 3,715,479 | 2/1973 | Brush et al. | 358/28 |
| 3,825,673 | 7/1974 | Schreiner et al. | 358/28 |
| 3,886,588 | 5/1975 | Dalke | 358/82 |
| 4,003,078 | 1/1977 | Owen | 358/22 |

Primary Examiner—Robert L. Griffin
Assistant Examiner—Aristotelis M. Psitos
Attorney, Agent, or Firm—Townsend and Townsend

[57] ABSTRACT

A chroma generation system provides the six major discrete colors in a NTSC color television system. This is achieved simply and inexpensively by a pair of resonant circuits which shift a fundamental color subcarrier signal by lead and lag relationships to provide yellow and magenta colors, respectively, and also provides the proper magnitudes so that when the vectors are combined, a red signal results. The fundamental color signal when inverted provides the complements of the foregoing colors to thus provide the six different discrete saturated colors.

7 Claims, 3 Drawing Figures

|  | TO A | TO B |
|---|---|---|
| RED | CLK | CLK |
| GREEN | OFF | $\overline{CLK}$ |
| BLUE | CLK | OFF |
| YELLOW | CLK | OFF |
| MAGENTA | OFF | CLK |
| CYAN | $\overline{CLK}$ | $\overline{CLK}$ |
| WHITE | OFF | OFF |

4,139,863

CHROMA GENERATION SYSTEM

BACKGROUND OF THE INVENTION

This invention relates to a chroma generation system which produces a color video subcarrier signal for decoding by a home color television receiver. More specifically, it is for use in conjunction with home video games.

Color video signals include a color burst reference signal. When the actual transmitted color subcarrier signal is compared with its reference signal the corresponding phase angles and amplitudes produce various colors on the video display. The decoding scheme is designed in accordance with the standards set up by the National Television Standards Committee (NTSC). Such a system ultimately, of course, produces red, green and blue driving signals for the electron gun of color television receivers. But it is theoretically designed keeping in mind the phase and maximum amplitudes of the six highly saturated colors which consist of red, green and blue and their complements cyan, magenta and yellow.

Prior systems for producing discrete colors for video game applications have sought to generate phase shifted signals by either delay lines or as shown in Alles U.S. Pat. No. 3,723,652 combining a number of phase shifted square wave signals to produce the different color signals. Neither of these systems produced highly saturated colors corresponding to all of the six saturated signals of the NTSC standards. For example, with phase delay techniques, signals produced result in slightly different shades of pale green or pale blue. In other words, the phase angles of the various signals rarely if ever corresponded exactly to those of the most saturated colors in the NTSC color system.

Another problem inherent in producing color signals for use in video games is the necessity for complying with Federal Communications Commission (FCC) regulations regarding radiation of broadcast type signals. Since most video game circuits are integrated and necessarily of the digital type, high frequency components are present because of the digital square waves. Thus it is usually necessary to provide additional filtering to eliminate such high frequency components. For example, see the Alles patent.

In conclusion in all the above-described systems, signals are produced which are separated in phase by essentially uncontrolled angles which do not precisely correspond to the most desired highly saturated color. As such, the colors tend to be pale and not well-defined, and of incorrect intensity so as not to produce a pleasing asthetic effect.

OBJECTS AND SUMMARY OF THE INVENTION

It is, therefore, a general object of the present invention to provide an improved chroma generation system.

It is another object of the invention to provide a system as above which can accurately and inexpensively produce all the major colors in a video system.

It is yet another object of the invention to provide a system as above where spurious broadcast type interference signals are eliminated.

In accordance with the above objects there is provided a chroma generation system for generating a video color subcarrier signal for decoding by a color television receiver and selectively producing a plurality of discrete colors. A fundamental signal having a frequency equal to the color signal is generated. A plurality of phase shift networks shift the phase of the fundamental signal by respectively different phase angles. Each of the phase shift networks individually produce an output signal corresponding to different discrete colors. When the phase shifted output signals are combined, their relative phase angles and amplitudes are predetermined to produce a combined signal corresponding to another discrete color.

DETAILED DESCRIPTION OF THE PREFERRED EMBODIMENT

Figure 1:
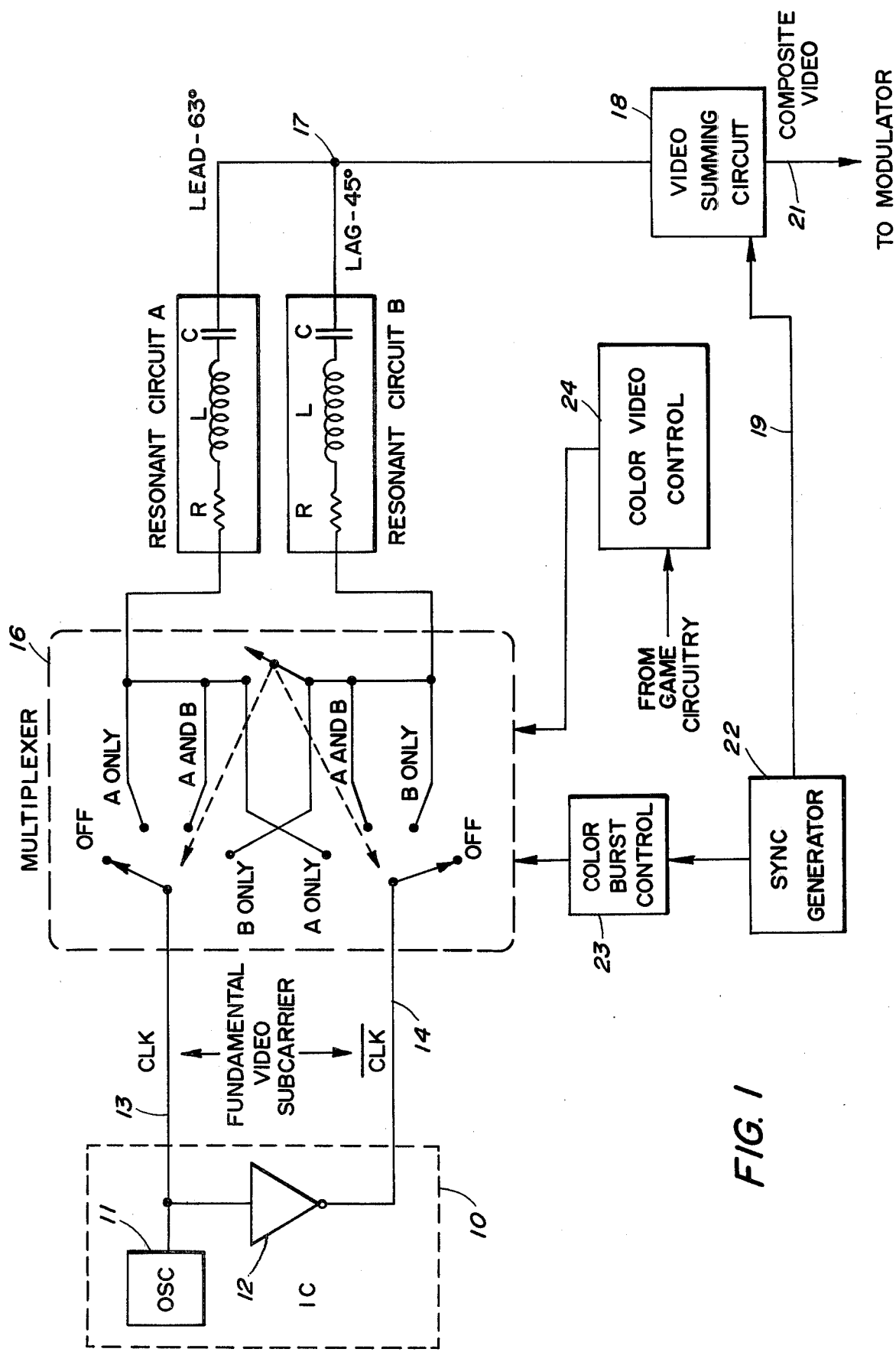
FIG. 1 is a block diagram of a system embodying the present invention.

Referring to FIG. 1, an integrated circuit 10 includes an oscillator 11 and inverter 12 which produce on the lines 13 and 14 the fundamental color subcarrier frequency of approximately 3.58 megahertz. Line 14 carries the inverted form of the clock ($\overline{CLK}$) or color signal on line 13. This frequency corresponds to NTSC standards. Since the signals on lines 13 and 14 are produced by an integrated circuit they are necessarily of the digital type meaning a square wave which swings between standard logic levels.

A pair of resonant circuits designated resonant circuits A and B with series RLC elements shift the phase of either the signal on line 13 or 14 by respectively different phase lead and phase lag angles. In the preferred embodiment circuit A is a lead network of 63° and circuit B a phase lag network of 45°.

The clock signals on lines 13 and 14 are multiplexed by multiplexer 16 to the inputs of the resonant circuits A and B; that is, the CLK on line 13 may be applied to either one of the resonant circuits or both of them and the same is true of $\overline{CLK}$. In addition the respective inputs of the resonant circuit may be in a "off" condition or deactivated. The various combinations produced by multiplexer 16 are shown in the truth table of FIG. 3. In actual practice multiplexer 16 would be constructed by the use of NMOS circuitry.

The outputs of circuits A and B are connected together at a current summing node 17 and then connected to a video summing circuit 18 which receives a sync input on line 19 to produce a composite video output on line 21. Output 21 then is connected to a modulator circuit which provides the appropriate radio frequency signal for input to a color television receiver. The sync generator 22 provides vertical and horizontal synchronizing pulses and also by means of color burst control 23 as will be described below provides the color burst reference signal. A color video control unit 24 driven by a video game circuit (not shown) actuates multiplexer 16 to provide a switching condition which generates the desired discrete video color subcarrier output signals on output line 21.

Figures 2, 3:
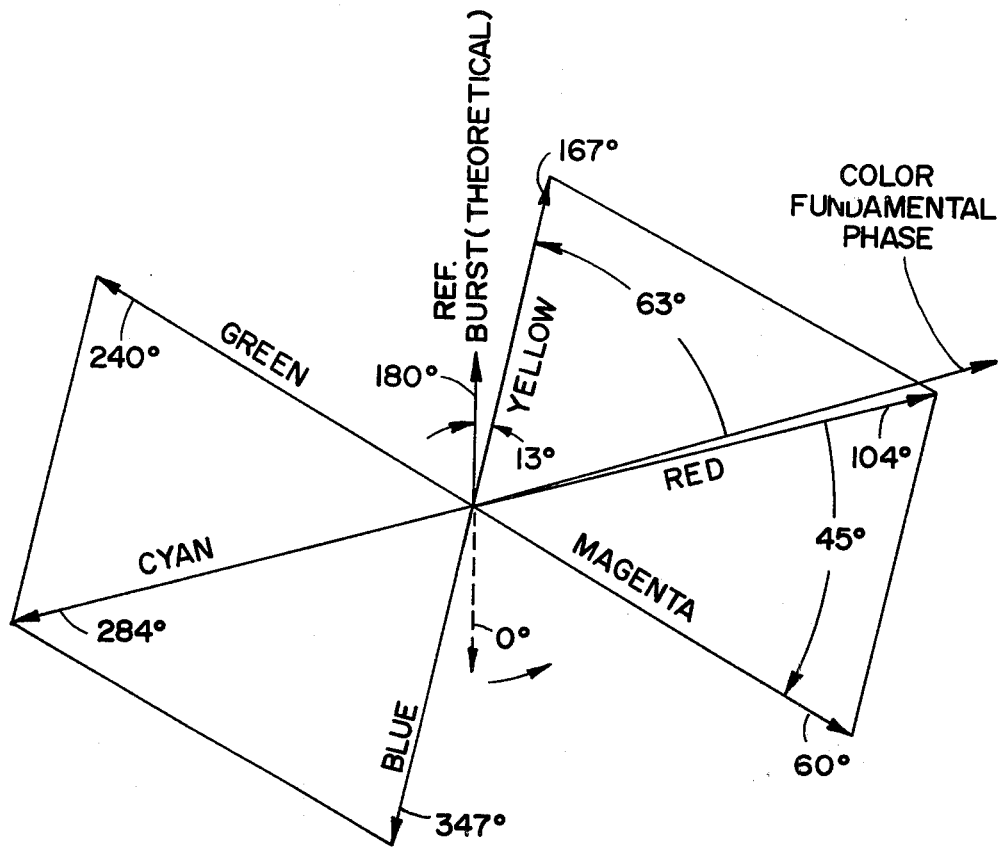
FIG. 2 is a polar plot of the discrete colors produced by the present invention which is related to a standard color television NTSC type color signal.
FIG. 3 is a truth table useful for understanding FIGS. 1 and 2.

The vector diagram of FIG. 2 shows the various signals produced at node 17 of FIG. 1 and how they correspond to the six major colors of the NTSC system. To summarize, red, green and blue are the primary colors with the respective complements being cyan, magenta and yellow. The phase angles of the colors are indicated and they are substantially identical to the NTSC phase angles. Note that the reference burst, which in a standard television communication system is always present in the composite video signal, is indicated as being at 180° or 13° displaced from the yellow vector.

In accordance with the invention the phase of the color fundamental signal produced on lines 13 and 14 is indicated by the color fundamental phase vector with circuit A providing a phase lead of 63° to produce a yellow vector and circuit B providing a lag of 45° producing a magenta vector. The respective amplitudes of resonant circuits A and B are adjusted so that when the yellow and magenta vectors are combined at current summing node 17 a standard red vector is produced at 104°. It is apparent that by providing correct phase and magnitude for the yellow and magenta vectors the red vector is accurately determined. Moreover, when the inverted clock signal on line 14 is utilized, green, cyan and blue complements are produced as shown by the truth table of FIG. 3. Note that blue and green result from the individual separate actions of only one of the resonant circuits with the other being unconnected or off whereas cyan the vector combination is produced by the summing at node 17.

While the reference burst at 180° could be generated in order to provide a suitable composite video signal at line 21, since the yellow vector is only 13° away, the present invention utilizes the yellow vector as the color burst reference signal in accordance with NTSC composite video signal standards. This is accomplished as illustrated in FIG. 1 by the color burst control unit 23 which under the control of the sync generator 22 generates the yellow signal at the appropriate time. This has the effect of rotating the whole vector pattern 13° which is the difference between the yellow and burst vectors. Compensation can easily be provided by readjusting the tint control of the color television receiver.

From the foregoing it is apparent that by the use of merely two resonant circuits A and B and adjusting the magnitude and phase properly, standardized NTSC yellow and magenta signals and all of the remaining six major highly saturated color signals of a television transmission system may be easily and economically produced. Moreover, all of these color signals will provide substantially saturated colors. Furthermore, from a circuit cost and construction standpoint, only the resonant circuits A and B need be separate from the large scale integration of the overall video game circuits.

DESIGN OF RESONANT CIRCUITS A AND B

In designing the foregoing resonant circuits a one megahertz bandwidth should be assumed and a 1.5 milliampere current at resonance for the lag network. Then by utilizing the predetermined 63° lead angles and 45° lag angles and by the use of the universal resonance curve with an assumed 6/10 volt peak to peak fundamental signal on lines 13 and 14 the following values result for each network:

Circuit A

R = 337 ohms
L = 71.5 microhenries
C = 20.25 picofarads

Lag circuit B

R = 400 ohms
L = 63.6 microhenries
C = 41.95 picofarads

The foregoing assumes the lag network is centered at 3.08 megahertz (compared to the fundamental frequency of 3.58 megahertz) and the lead network is centered at 4.08 megahertz. Finally the resistances are calculated keeping in mind the desired amplitude and the lead and lag of the yellow and magenta where the yellow axis is 0.75 of the magenta axis.

The resonant circuits also act as bandpass filters thus eliminating the inherent high harmonics of the digital type fundamental signal to prevent any interference to thereby comply with FCC requirements.

The preferred use of the system is in a home video game unit where several different video games are selectable by the user. Thus for each video game a different background color can be used.

The present invention can also be used in video display systems other than the NTSC system. For example in the PAL system appropriate changes would have to be made in the position of the burst vector which would have to be shifted by 90° and the sum signal at the current summing node 17 of FIG. 1 would have to be shifted accordingly.

Thus an improved chroma generation system has been provided where color signals are generated which correspond substantially with the discrete saturated colors of a standard color video display. In addition the generation of spurious signals is prevented.

What is claimed is:

1. A chroma generation system for generating a video color subcarrier signal for decoding by a color television receiver and selectively producing a plurality of discrete colors comprising: means for generating a fundamental unmodulated signal having a frequency equal to said color signal; a plurality of phase shift networks for shifting the phase of said fundamental signal by respectively different phase angles each of said phase shift networks individually producing an output signal corresponding to different discrete colors; and electrical circuit means for combining said phase shifted output signals, said relative phase angles and amplitudes of said output signal being predetermined to produce a combined output signal corresponding to another discrete color.

2. A system as in claim 1 including means for inverting said fundamental signal whereby said phase shift networks produce output signals corresponding to additional discrete colors.

3. A system as in claim 1 in which said phase shift networks are resonant circuits each having a center resonant frequency different from said fundamental signal frequency.

4. A system as in claim 3 in which said phase shift networks comprise series connected resistive, capacitive, and inductive elements.

5. A chroma generation system for generating a color subcarrier signal which when decoded by a color television receiver designed in accordance with the National Television Standards Committee (NTSC) will substantially and selectively produce the three primary (red, green and blue) and complementary (cyan, magenta, and yellow) colors said system comprising: digital fundamental unmodulated subcarrier signal generating means for generating a signal having a frequency equal to said color signal including means for inverting such fundamental signal; a pair of phase shift networks for respectively providing a phase lead and lag with respect to said fundamental signal to produce yellow and magenta signals respectively having relative magnitudes and phases in accordance with NTSC standards; electrical circuit means for combining the outputs of said networks to produce a red signal; and means for connecting said inverted fundamental signal to said lead and lag networks to respectively produce blue and green signals and a cyan combined signal.

6. A system as in claim 5 wherein said phase shift networks consist of tuned resonant circuits whereby higher harmonics of said digital fundamental signal are eliminated.

7. A system as in claim 5 together with means for utilizing said yellow signal as a color reference burst for a composite video signal.